Jan. 20, 1931.  C. B. CLARK  1,789,460
PROCESS OF AND APPARATUS FOR CONVERTING $SO_2$ TO $SO_3$
Filed Nov. 10, 1926  3 Sheets-Sheet 1
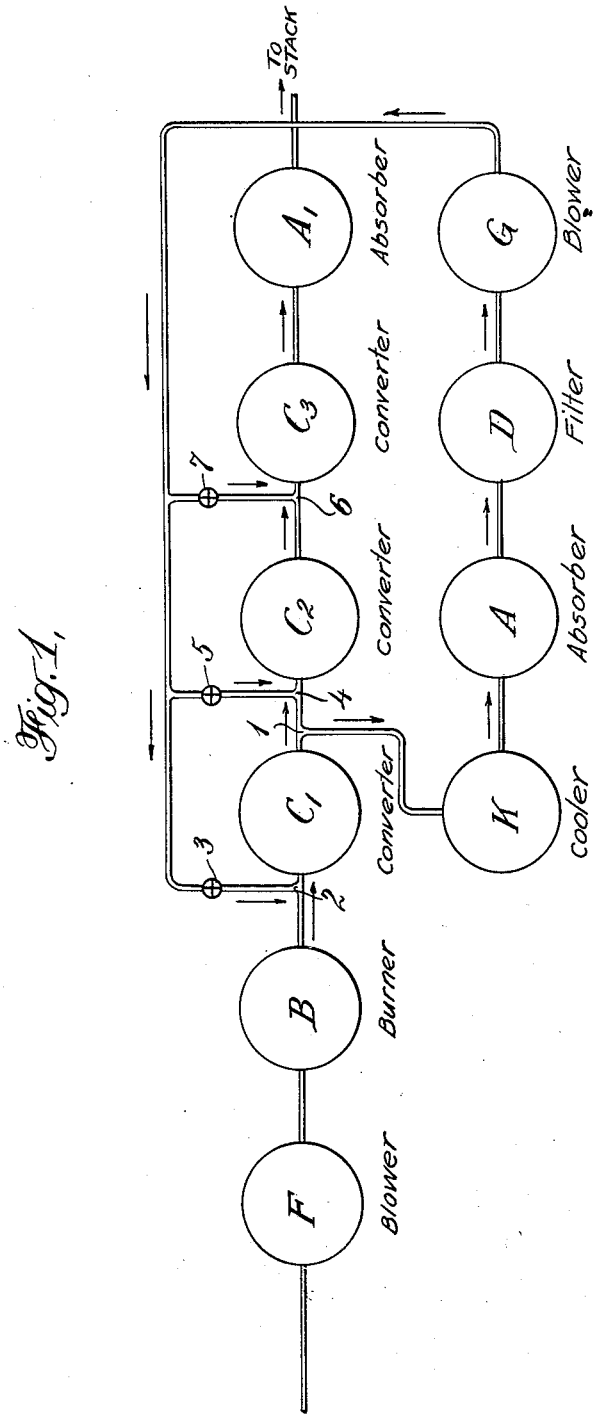
INVENTOR
Cyril B. Clark
BY Forbes Silsby
ATTORNEY

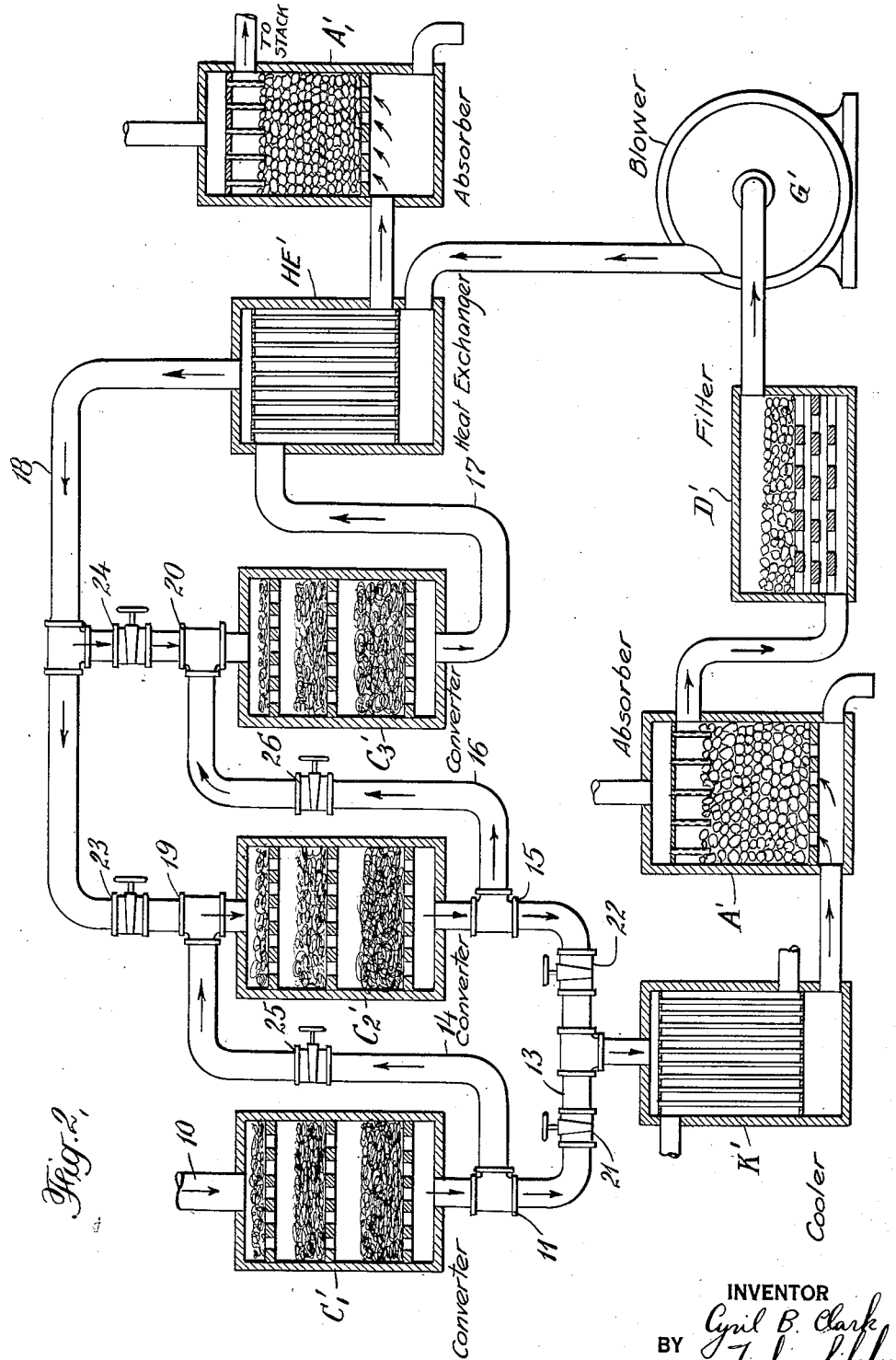

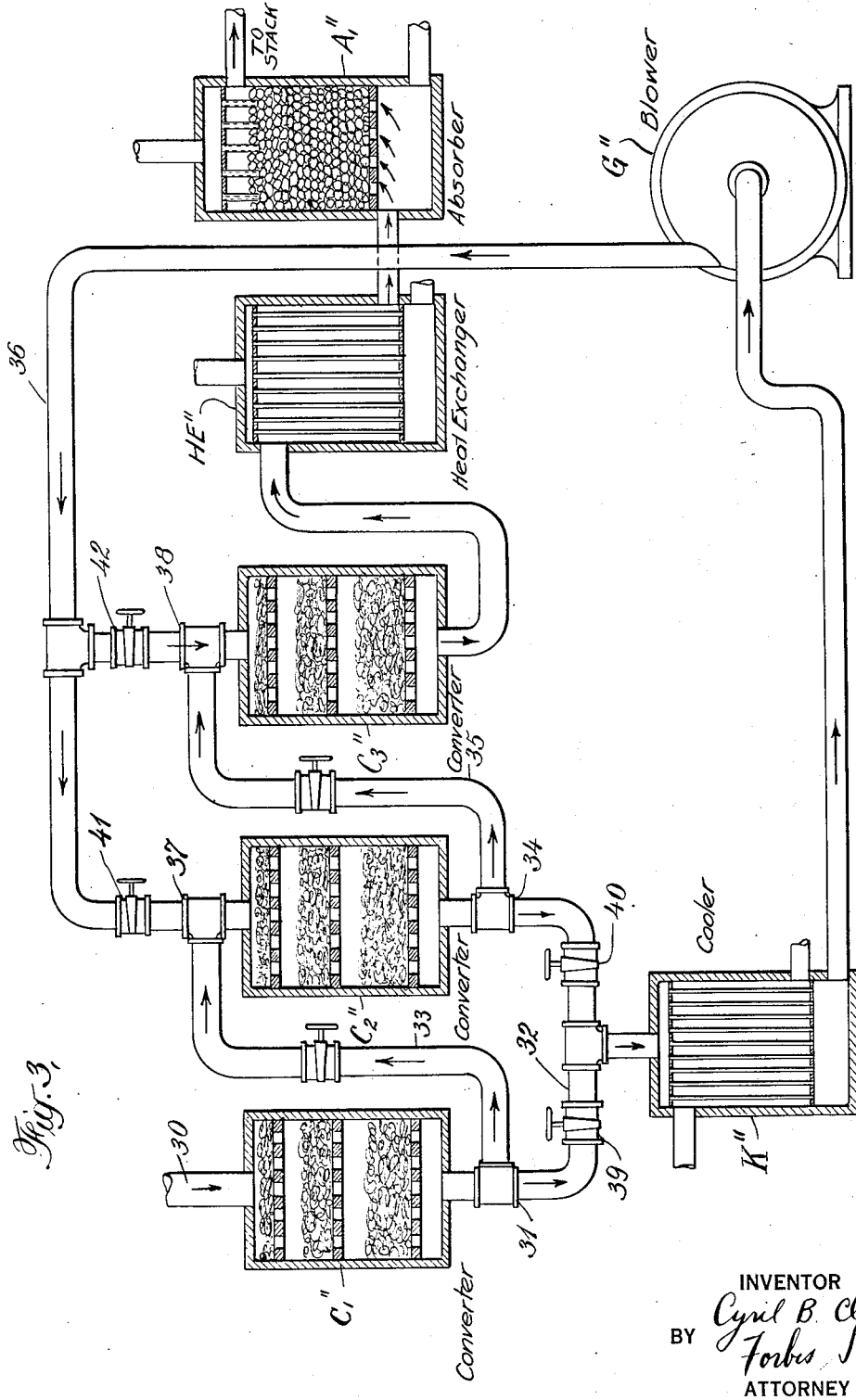

Patented Jan. 20, 1931

1,789,460

UNITED STATES PATENT OFFICE

CYRIL B. CLARK, OF SCARSDALE, NEW YORK, ASSIGNOR TO GENERAL CHEMICAL COMPANY, OF NEW YORK, N. Y., A CORPORATION OF NEW YORK

PROCESS OF AND APPARATUS FOR CONVERTING $SO_2$ TO $SO_3$

Application filed November 10, 1926. Serial No. 147,502.

This invention relates to improvements in the process of and apparatus for producing sulfuric anhydride from sulfur dioxide and oxygen by the contact process.

In the manufacture of sulfuric anhydride by the contact process it is essential to maintain close regulation and control of the temperature throughout the system in order to obtain a high yield of $SO_3$ and to operate at efficiencies which are vital to commercial success.

Throughout the process, both in the brimstone or pyrites burners where the sulfur dioxide is produced and in the converters where the catalytic oxidation of the $SO_2$ to $SO_3$ occurs, a large amount of heat is developed. This heat must be controlled not only to supply the reacting gas at sufficiently high temperatures for the proper conversion but also to prevent the temperatures of the gas at different points in the system from rising above that at which most efficient conversion is obtained. If the conversion is carried on in successive stages, the gas leaving each converter will ordinarily be above the optimum temperature for the most efficient conversion in the next converter. Likewise the gas coming from the brimstone burners is usually above that temperature at which most efficient conversion may be obtained if it is passed directly to the converters, as in the Merriam process in which cold purification is not contemplated. As a result of these conditions the gas must be cooled at various points in the system.

In order to control the temperature of the gas it has heretofore been the practice to install cooling units or heat transferrers before and between the converters so that the temperature of the gas could be regulated. However this practice has many disadvantages. Particularly does the large size of apparatus necessary to cool the entire volume of the gas render the cost high. And further, because of the corrosive action of the hot $SO_2$ and $SO_3$ gases at certain temperatures, it is necessary to very carefully regulate the entire cooling system to prevent local abnormal and harmful conditions.

I have discovered a method of and means for converting $SO_2$ to $SO_3$ which, to a large extent, avoids the foregoing disadvantages and in addition possesses many advantages. The more important of these advantages are the better conversion of the $SO_2$ to $SO_3$, the closer control of the temperature throughout the system, the smaller apparatus and lesser amount of catalyst required to effect a maximum conversion, and the reduction of the sulfur loss due to the lesser amounts of sulfur dioxide in the exit gas.

Broadly speaking, my invention consists in removing a portion of the partially converted gas from the converters or contact chambers, cooling, and absorbing the $SO_3$ which is present in the gas. After cooling and absorption have occurred, the gas is returned to the system at a point where it is desired to effect cooling or to dilute an excessively strong gas, and by thus introducing a controlled amount of cool gas into the hot gases in the system, it becomes possible to obtain a resulting gas mixture of whatever temperature desired without the necessity for large and elaborate heat transferrers intermediate the converters and to obtain other advantages as pointed out hereinafter.

In the ordinary operation of catalytic converters, it is commercially impossible to obtain a quantitative conversion of $SO_2$ to $SO_3$. However if the ratio of the concentration of $SO_2$ to the concentration of $SO_3$ is properly adjusted the ultimate conversion may be considerably increased. According to the mass action law, if the ratio of $SO_2$ to $SO_3$ is increased, the rate of conversion is increased. By removing a suitable portion of the partially converted gases from the converter, cooling, absorbing substantially all of the $SO_3$ present in the mixture, and returning the unabsorbed portion to the converters, the ratio of $SO_2$ to $SO_3$ in the resulting cooled gas may be greatly increased. The removal of a portion of the partially converted gases for the purpose of cooling the treated gas to the desired temperature and of absorbing the $SO_3$ contained therein, gives a two-fold benefit; first, the gas in any part of the conversion system may be maintained at an optimum temperature by the reintroduction of cooled gas, and second, the ratio of $SO_2$ to $SO_3$ may be materially increased thereby increasing the ultimate conversion.

The invention will be best understood from the following illustrative examples taken in connection with the accompanying drawings in which:

Fig. 1 represents diagrammatically a system for the conversion of $SO_2$ to $SO_3$ embodying my invention;

Fig. 2 is a side elevation partly in section of one specific and preferred form of apparatus embodying my invention, and Fig. 3 represents a side elevation partly in section of a modified embodiment of the invention as shown in Fig. 2.

In the illustration shown in Fig. 1 three converters $C_1$, $C_2$, $C_3$, are joined in series. A blower F positioned before a sulfur burner B serves to force air into the latter to provide a mixture of hot sulfur dioxide and oxygen which is conducted to the first converter $C_1$. A portion of the gas after partial conversion in the first converter $C_1$, is withdrawn at a suitable point 1 and passed through a cooler K and an absorbing tower A where the $SO_3$ is removed, and the temperature of the gas reduced to a desirable degree but substantially below that suitable for subsequent conversion. Any acid mist in the unabsorbed gas may be removed by filtration through a coke filter D or by any other known means. The cool gas, free from $SO_3$ but containing substantial amounts of sulfur dioxide and oxygen may be reintroduced into the system at such points as desired by means of the blower G. It may be returned to the system at the point 2 where it mixes with the hot gases from the burner, and by properly proportioning the amount of gas introduced, and the temperature to which it has been cooled, the resulting temperature of the gas mixture going to the first converter may be regulated to the value desired for conversion. A valve 3 controls the quantity of gas so reentering the system at the point 2.

Instead of returning the cooled partially converted gas to a point in the system which is prior to the point at which it is withdrawn therefrom, it may be returned near but subsequent to such point. For instance, the gas from the absorber A may be returned to the system at the point 4 where it mixes with the hot gas passing directly from the converter $C_1$ to the converter $C_2$. The amount of cooled and $SO_3$ free gas which is reintroduced at the point 4 will be controlled by the valve 5. Or the gas withdrawn at the point 1 may be cooled, freed from $SO_3$, and returned to the system after a subsequent converter as indicated at the point 6, thereby cooling the gas which passes directly from the converter $C_2$ to the converter $C_3$. The amount of gas so by-passed will be controlled by a suitable valve 7. A similar arrangement may obviously be installed whereby the partially converted gas is withdrawn at a point intermediate the converters $C_2$ and $C_3$, the cooler and absorber being either independent of or in conjunction with the cooler K and absorber A. Any or all of these methods of operating may be carried on at the same time and the temperature and the concentration of the reacting gases going to the converters may thus be regulated to provide optimum conditions for conversion. The converted gas is lead from the last converter, after cooling, to an absorption tower A, and from the absorption tower to a stack.

A specific and preferred embodiment of the present invention is shown in Fig. 2. The arrows indicate the direction of gas flow throughout the system. A gas mixture containing sulfur dioxide and oxygen, having been previously cooled to the correct conversion temperatures, enters the system at the inlet 10 and passes into the first converter $C'_1$. In this converter the temperature of the gas mixture rises rapidly due to the evolution of heat of reaction occurring therein. A portion of this hot partially converted gas is withdrawn from the first converter at the point 11 and is conducted into a header 13. The remainder of the partially converted gas passes directly into a second converter $C'_2$ through the conduit 14. The same procedure is carried out in the second converter in that a portion of the hot partially converted gas leaves at the point 15 and enters the header 13 while the remainder of the gas passes through the conduit 16 directly to the next converter $C'_3$. This operation may be repeated as often as is desirable. In the last unit of the converter system the process of conversion is carried as far as it is desired. The converted gas after leaving the last converter passes through the conduit 17 to a heat exchanger HE' and then into an absorber $A'_1$, where the $SO_3$ is absorbed. After the absorption operation has been completed the gas passes to the stack and is discharged to the atmosphere. In order to control the temperature and concentration of the reacting constituents throughout the system, the gas withdrawn into the header 13 is passed through a cooler K' and an absorber A' where the $SO_3$ is removed, thence through a coke filter or other means D' to remove any acid mist, and is then returned to the system at suitable points to bring about the desired results. The cooling of the gas occurring in the cooler K' may be effected by air, steam, or any other suitable means. A blower G' forces the gas leaving the absorber A' through the heat exchanger HE' where the gas is tempered to the correct temperature. The gas is then blown through a header 18 and is reintroduced into the system. A portion of the returned gas mixes with the hot partially converted gas coming from the first converter at the point 19 so that the temperature and concentration of the reacting constituents in the gas mixture are at their optimum value before the said mixture passes to the second converter. Similarly, a portion of the returned gas is reintroduced at the point 20 to bring the gas mixture going to the third converter to its optimum conditions. It will be noted that by the reintroduction at suitable points of the relatively cool gas at the proper temperature and in the proper proportion to the hot reacting gas, predetermined conversion conditions may be maintained throughout the system. The amount of partially converted gas withdrawn after the several converters will be controlled by the valves 21, 22, etc., while the amount of gas reintroduced into the system will be controlled by the valves 23 and 24. Valves 25, 26, etc., may be placed in the conduits 14, 16, etc., respectively which directly connect the several converters.

The heat exchanger HE' may be eliminated, as it is placed in the system merely to allow a larger amount of gas to be withdrawn, cooled, and reintroduced, than if the heat available in the gas going to the final absorber were not thus utilized. Only that amount of gas is withdrawn into the header 13 as will produce the proper conditions in the system when reintroduced. It will be seen that by utilizing the heat from the third converter in the heat exchanger HE', the temperature of the cooled gas will be slightly raised before its reintroduction into the system. Consequently a larger amount of such gas may be reintroduced than if the heat exchanger were not used and the temperature of the gas was correspondingly lower.

By way of example, assume that a gas mixture containing 12% $SO_2$ and 8% $O_2$ is to be converted into $SO_3$. The gas mixture, properly purified, is adjusted to the optimum temperature for the initiation of the conversion in the presence of a platinum catalyst, i. e. 750° F., and is introduced at the inlet 10 of the first converter $C'_1$. In the first stage the mixture will be about 50% converted causing the temperature of the gases to increase to about 1180° F. This partially converted gas is divided into two portions, approximately 50% of the gas passing directly to the second converter through the conduit 14 while the remaining 50% is removed from the converter at the point 11 and is conducted through the header 13 to the absorber. To replace the quantity of gas so withdrawn from the system an approximately equal amount of cold gas from the absorber will be introduced at the point 19. The temperature of this cold gas from the absorber, and after heat interchange with the gases leaving the last converter, is about 320° F. The temperature of the resulting mixture of hot and cold gases entering the second converter will be, therefore, approximately 750° F., i. e. the optimum value for the continuation of the conversion. The gases after passing through the second converter will be about 83% converted and at a temperature of about 990° F. Approximately 33% of this partially converted gas is withdrawn from the system at the point 15 and conveyed to the absorber while the remaining 67% of hot gas passes directly to the third converter through the conduit 16. An amount of cold gas equal to the proportion withdrawn and at a temperature of 320° F. is introduced at the point 20 whereby the temperature of the resulting gas mixture entering the third converter is adjusted to its optimum value, i. e. about 770° F. It must be understood that the proportions and temperatures given are merely by way of illustration and will necessarily be varied with the strength of the initial gas, the proportion of the total conversion accomplished in each stage, the temperature of the cold gases from the absorber, etc.

While according to my preferred method of operation the gas which is withdrawn from the system is cooled and treated to absorb the $SO_3$, nevertheless many of the advantages obtained by my invention are still retained when the absorption stage is omitted and the withdrawn gas is simply cooled and returned directly to the system. Furthermore this method of operating offers certain economies in original cost, maintenance, and operation, more particularly in that it involves less equipment and consumes less power. Such a modified system is shown in Fig. 3, the arrows indicating the direction of gas flow throughout the system. The gas mixture from a sulfur burner, cooled to the proper temperature, enters the system at the inlet 30, and passes into the first converter $C''_1$. A portion of the hot partially converted gas from the first converter is withdrawn at the point 31 and is conducted into the header 32. The remainder of the partially converted gas passes directly into the second converter $C''_2$ through the conduit 33. The same procedure is carried out in the second converter, a portion of the gas being withdrawn at the point 34 and passing into the header 32 while the remainder passes directly to the third converter $C''_3$ through the conduit 35. In the last converter the conversion is completed to the point desired. The gas is then cooled in the heat exchanger HE'', passed through an absorber $A''_1$ to remove the $SO_3$, and thence to the stack. The gas withdrawn into the header 32 passes through a cooler K'' where the temperature of the gas is reduced to a point considerably below that suitable for subsequent conversion. The cooling may be effected by air, steam, or any other suitable means. A blower G'' is positioned in the line and serves to circulate the gas and to return it through a header 36 to the system at the points 37 and 38 whereby the gas passing to the second and third converters respectively is regulated to the proper temperature. The amount of gas withdrawn from the system at the points 31 and 34 will be regulated by suitable valves 39 and 40 and likewise the amount of cooled gas reintroduced into the several converters will be regulated by the valves 41 and 42 in order that the proper cooling effect may be obtained. By this method and means of operation the excess heat in the converters is taken up and may be utilized at a single point and the gas passing into successive converters is properly regulated to obtain optimum conditions for conversion.

According to my preferred method of operating the systems disclosed in Figs. 2 and 3, approximately the same amount of gas is returned at the point prior to the second converter as is withdrawn from the first converter and similarly the same amount is returned prior to the third converter as is withdrawn after the second. This permits a substantially uniform flow of gas through the successive converters and a uniform size of converters.

The operation of my novel process should be clearly distinguished from the method of multi-stage conversion wherein all the gas is cooled and all the $SO_3$ formed in one stage is removed before the introduction of the gas to the next stage. In this method of operation a plurality of large, elaborate, and expensive heat transferrers are required to bring the cooled and $SO_3$ free gas to the proper temperature for subsequent conversion. Furthermore, the power cost encountered in handling the entire volume of gas is excessive, and the method has proven unsuccessful from a commercial standpoint.

It will be obvious that by employing the preferred embodiment of my invention smaller size equipment may be used because the absorption of $SO_3$ from the gas mixture before final conversion progressively reduces the volume of gas to be handled from stage to stage. It will be further noted that less catalyst is required for my system because of the maintenance of temperature conditions and concentration of the reacting constituents at their optimum values through the system. By cooling a small portion of the gas through a wide temperature range and then adding such cool gas to the unaltered body of gas to effect a small temperature change, I am able to effect a very close regulation of temperature of the entire body of gas. Moreover, due to the better conversion of $SO_2$ to $SO_3$ obtained by the elimination of a considerable portion of the $SO_3$ in the system prior to the final conversion stage, there will be smaller sulfur loss in the exit gas from the system.

It will be obvious to those skilled in the art that many modifications of my invention disclosed herein may be made without departing from the spirit and scope of the invention.

I claim:

1. The improvement in the process of forming $SO_3$ by catalytic oxidation of sulfur dioxide in stages which comprises removing a portion of the hot partially converted gas from the conversion system, cooling said portion to a temperature below that suitable for subsequent conversion, and reintroducing said cooled portion into the hot gas of said system whereby the resulting gas mixture acquires the pretermined temperature for conversion.

2. The improvement in the process of forming $SO_3$ by catalytic oxidation of sulfur dioxide in stages which comprises removing a portion of the hot, partially converted gas from the conversion system, cooling said portion to a temperature below that suitable for subsequent conversion, absorbing the $SO_3$ in said portion, and reintroducing said cooled portion into the hot gas of said system whereby the resulting gas mixture acquires the predetermined temperature for conversion.

3. The improvement in the process of forming $SO_3$ by the contact process which comprises converting $SO_2$ to $SO_3$ in stages, withdrawing a portion of the partially converted gas after any predetermined stage, cooling the said portion of gas to a temperature below that suitable for subsequent conversion, passing the remainder of the partially converted gas from such stage directly to the subsequent stage, reintroducing that portion of gas which has been withdrawn and cooled into that portion of gas passing directly to the subsequent stage, and adjusting the proportion of cooled and uncooled gas so that the resulting gas mixture acquires the predetermined temperature for the next stage of conversion.

4. The improvement in the process of forming $SO_3$ by the contact process which comprises converting $SO_2$ to $SO_3$ in stages, withdrawing a portion of the partially converted gas after any predetermined stage, cooling the said portion of gas to a temperature below that suitable for subsequent conversion, absorbing the $SO_3$ from the said portion, passing the remainder of the partially converted gas from such stage directly to the subsequent stage, reintroducing the portion of gas which has been withdrawn and cooled into that portion of gas passing directly to the subsequent stage, and adjusting the proportion of the cooled and uncooled gas so that the resulting gas mixture acquires the predetermined temperature for the next stage of conversion.

5. The improvement in the process of forming $SO_3$ by the contact process which comprises converting $SO_2$ to $SO_3$ in stages, withdrawing controlled portions of the partially converted gas after each of the several stages, cooling said portions to a temperature below that for subsequent conversions, passing the remaining portions of the gas from the successive converters directly to the respective subsequent converters, and reintroducing the cooled portions of the gas into the system to effect cooling prior to conversion stages, whereby the resulting gas mixtures passing into each converter acquire the predetermined temperature for the conversion therein.

6. The improvement in the process of forming $SO_3$ by the contact process which comprises converting $SO_2$ to $SO_3$ in stages, withdrawing controlled portions of the partially converted gas after the several stages, cooling said portions to a temperature below that for subsequent conversion, absorbing the $SO_3$ in said portions, passing the remaining portions of the gas from the successive converters directly to the respective subsequent converters, and reintroducing the cooled portions of the gas free from $SO_3$ into the system to effect cooling prior to conversion stages, whereby the resulting gas mixtures passing into each converter acquire the predetermined temperature for conversion therein.

7. In a system for the production of $SO_3$, means for producing a gas mixture containing sulfur dioxide and oxygen, means for converting the $SO_2$ to $SO_3$ in stages, means for conducting a portion of the partially converted gas directly from one stage to a subsequent stage, means for withdrawing a portion of the partially converted gas from a point intermediate said stages, means for cooling said portion, means for absorbing the $SO_3$ in said portion, and means for returning said cooled portion into the system.

8. In a system for the production of $SO_3$, means for producing a gas mixture containing sulfur dioxide and oxygen, means for converting the $SO_2$ to $SO_3$ in stages, means for conducting a portion of the partially converted gas directly from one stage to a subsequent stage, means for absorbing the $SO_3$ after final conversion, means for withdrawing a portion of the partially converted gas from a point intermediate said stages, means for cooling said portion, means for absorbing $SO_3$ in said portion, and means for returning said cooled portion into the system at a point intermediate said stages.

9. In a system for the production of sulfuric acid, in combination, a burner for producing a sulfur dioxide-oxygen mixture, a plurality of converters operatively joined in series for converting said sulfur dioxide-oxygen mixture into $SO_3$ in stages, means for removing portions of the partially converted gas mixture from said converters, a cooler and an $SO_3$ absorber operatively associated with the aforesaid means, means for reintroducing the gas unabsorbed by said absorber into the partially converted gas of the system, and a final $SO_3$ absorber for treating the gas leaving the final converter.

10. The improvement in the process of forming $SO_3$ by catalytic oxidation of sulfur dioxide in stages which comprises removing a portion of the hot partially converted gas from the conversion system, cooling said portion to a temperature below that suitable for subsequent conversion, and reintroducing, prior to a conversion stage, said cooled portion into the hot gas of said system whereby the resulting gas mixture acquires the predetermined temperature for conversion.

11. The improvement in the process of forming $SO_3$ by catalytic oxidation of sulfur dioxide in stages which comprises removing a portion of the hot partially converted gas from the conversion system, cooling said portion to a temperature below that suitable for subsequent conversion, absorbing the $SO_3$ in said portion, and reintroducing, prior to a conversion stage, said cooled portion into the hot gas of said system whereby the resulting gas mixture acquires the predetermined temperature for conversion.

In testimony whereof, I affix my signature.

CYRIL B. CLARK.